US011429442B2

(12) United States Patent
Gummaraju et al.

(10) Patent No.: US 11,429,442 B2
(45) Date of Patent: Aug. 30, 2022

(54) PARALLEL AND DISTRIBUTED COMPUTING USING MULTIPLE VIRTUAL MACHINES

(71) Applicant: VMware, Inc., Palo Alto, CA (US)

(72) Inventors: Jayanth Gummaraju, San Francisco, CA (US); Gabriel Tarasuk-Levin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 257 days.

(21) Appl. No.: 15/195,819

(22) Filed: Jun. 28, 2016

(65) Prior Publication Data
US 2016/0378554 A1    Dec. 29, 2016

Related U.S. Application Data

(60) Provisional application No. 62/185,994, filed on Jun. 29, 2015.

(51) Int. Cl.
*G06F 9/50* (2006.01)
*G06F 9/455* (2018.01)

(52) U.S. Cl.
CPC ........ *G06F 9/5011* (2013.01); *G06F 9/45558* (2013.01); *G06F 2009/45562* (2013.01); *G06F 2009/45587* (2013.01)

(58) Field of Classification Search
CPC ............... G06F 9/45558; G06F 9/5011; G06F 2009/45562; G06F 2009/45587
USPC .......................................................... 718/1
See application file for complete search history.

(56) References Cited

U.S. PATENT DOCUMENTS

| 5,623,659 | A  | * | 4/1997 | Shi ........................... G06F 9/52 |
| 7,346,909 | B1 | * | 3/2008 | Eldar ................ H04L 29/12924 |
| | | | | 709/202 |
| 8,370,838 | B1 | * | 2/2013 | Omelyanchuk ..... G06F 11/3644 |
| | | | | 709/201 |
| 8,972,980 | B2 | * | 3/2015 | Banga ................... G06F 9/5027 |
| | | | | 709/222 |

(Continued)

OTHER PUBLICATIONS

Slagter et al. "Dynamic Data Partitioning and Virtual Machine Mapping: Efficient Data Intensive Computation". In Cloud Computing Technology and Science (CloudCom), 2013 IEEE 5th International Conference on (vol. 2, pp. 220-223).*

*Primary Examiner* — Meng Ai T An
*Assistant Examiner* — Willy W Huaracha
(74) *Attorney, Agent, or Firm* — Fish & Richardson P.C.

(57) ABSTRACT

Systems and techniques are described for using virtual machines to write parallel and distributed applications. One of the techniques includes receiving a job request, wherein the job request specifies a first job to be performed by a plurality of a special purpose virtual machines, wherein the first job includes a plurality of tasks; selecting a parent special purpose virtual machine from a plurality of parent special purpose virtual machines to perform the first job; instantiating a plurality of child special purpose virtual machines from the selected parent special purpose virtual machine; partitioning the plurality of tasks among the plurality of child special purpose virtual machines by assigning one or more of the plurality of tasks to each of the child special purpose virtual machines; and performing the first job by causing each of the child special purpose virtual machines to execute the tasks assigned to the child special purpose virtual machine.

23 Claims, 5 Drawing Sheets

(56) References Cited

U.S. PATENT DOCUMENTS

| | | | | |
|---|---|---|---|---|
| 8,997,093 | B2* | 3/2015 | Dimitrov | G06F 8/61 718/1 |
| 2009/0265299 | A1* | 10/2009 | Hadad | G06N 5/02 706/55 |
| 2010/0153945 | A1* | 6/2010 | Bansal | G06F 9/4881 718/1 |
| 2010/0217916 | A1* | 8/2010 | Gao | G06F 12/1036 711/6 |
| 2011/0035802 | A1* | 2/2011 | Arajujo, Jr. | G06F 11/079 718/1 |
| 2011/0296412 | A1* | 12/2011 | Banga | G06F 9/45545 718/1 |
| 2011/0314465 | A1* | 12/2011 | Smith | G06F 9/5077 718/1 |
| 2012/0078844 | A1* | 3/2012 | Kim | G06F 11/1662 707/640 |
| 2012/0084517 | A1* | 4/2012 | Post | G06F 9/45541 711/153 |
| 2012/0131591 | A1* | 5/2012 | Moorthi | G06Q 10/06 718/104 |
| 2013/0097603 | A1* | 4/2013 | Amano | G06F 9/4843 718/1 |
| 2013/0290958 | A1* | 10/2013 | Ansel | G06F 9/45504 718/1 |
| 2014/0033220 | A1* | 1/2014 | Campbell | G06F 9/5083 718/104 |
| 2016/0004803 | A1* | 1/2016 | Chyou | G06F 9/50 703/2 |
| 2017/0249188 | A1* | 8/2017 | Saladi | G06F 9/45533 |

* cited by examiner

PARALLEL AND DISTRIBUTED COMPUTING USING MULTIPLE VIRTUAL MACHINES

CROSS-REFERENCE TO RELATED APPLICATIONS

This application claims the benefit under 35 U.S.C. § 119(e) of the filing date of U.S. Patent Application No. 62/185,994, which was filed on Jun. 29, 2015, and which is incorporated here by reference.

BACKGROUND

This document relates to using a set of virtual machines to execute a job in a distributed manner.

A virtual machine (VM) is a software-based abstraction of a physical computer system. A physical computer system, referred to as a physical machine, can execute one or more VMs. A physical computer executes a VM using virtualization software, typically referred to as a "hypervisor." The hypervisor is software that is logically interposed between and interfaces with a VM and a physical computer system. A hypervisor refers to a virtual machine monitor/controller (VMM), where a hypervisor manages a system such that multiple operating systems share resources according to a set of rules. In general, each VM is executable on an operating system.

SUMMARY

In general, one aspect of the subject matter described in this document can be embodied in a technique that includes receiving a job request, wherein the job request specifies a first job to be performed by a plurality of a special purpose virtual machines, wherein the first job includes a plurality of tasks; selecting a parent special purpose virtual machine from a plurality of parent special purpose virtual machines to perform the first job; instantiating a plurality of child special purpose virtual machines from the selected parent special purpose virtual machine; partitioning the plurality of tasks among the plurality of child special purpose virtual machines by assigning one or more of the plurality of tasks to each of the child special purpose virtual machines; and performing the first job by causing each of the child special purpose virtual machines to execute the tasks assigned to the child special purpose virtual machine.

Particular embodiments of the subject matter described in this document realize one or more of the following advantages. By using virtual machines, a single physical machine may host multiple distinct and independent operating environments. Furthermore, using multiple virtual machines to perform distributed and parallel processing enables a programmer to break complex applications or jobs into smaller units of work, e.g., tasks, and execute them independently and in parallel.

By using virtual machines to perform tasks in parallel, performance and security isolation in executing tasks can be improved. In particular, the parallel execution allows for the simultaneous processing of multiple streams of data, which increases performance and decreases execution time. The distributed nature in the execution of tasks on multiple virtual machines provides increased security isolation. By performing multiple tasks in parallel, virtual machines increase hardware utilization and reduce capital and operating costs by sharing virtual machines. Additionally, virtual machines provide flexibility in allowing applications to execute in different operating environments.

The details of one or more embodiments of the subject matter described in this document are set forth in the accompanying drawings and the description below, accompanied by further description in Appendix A. Other features, aspects, and advantages of the subject matter will become apparent from the description, the drawings, the claims, and the description in Appendix A.

BRIEF DESCRIPTION OF THE DRAWINGS

Like reference numbers and designations in the various drawings indicate like elements.

DETAILED DESCRIPTION

Figure 1A:
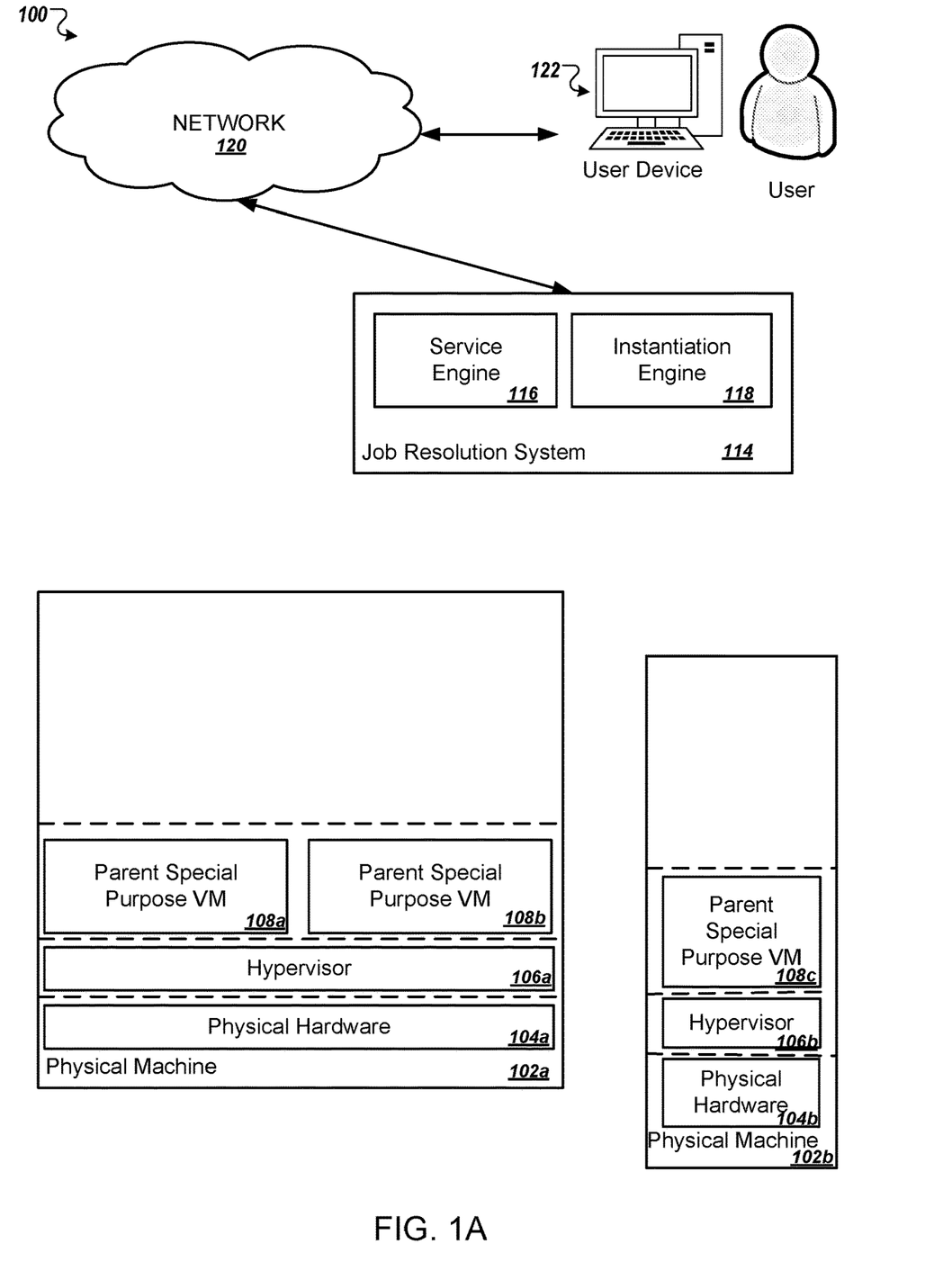
FIG. 1A shows an example job resolution system.

FIG. 1A shows an example job resolution system 114. The job resolution system 114 is an example of a system implemented as computer programs on one or more computers in one or more locations, in which the systems, components, and techniques described below, are implemented.

The job resolution system 114 processes job requests received from users of the system, e.g., a user 122, across a data communication network 120. The data communication network 120, e.g., a local area network (LAN) or wide area network (WAN), e.g., the Internet, or a combination of networks, connects the user 122 and the job resolution system 114. The job resolution system 114 converts the job requests received from the user 122 into a job to be processed using special purpose virtual machines (VMs) executing on one or more physical machines, e.g. physical machines 102a or 102b. Generally, a job request is a request to process input data identified in the request using a specific service. For example, the job request may be a request to perform a specified distributed computation on a set of data received with the request using a specific distributed data processing framework. As another example, the job request may be a request to provide user interface data generated by one or more applications for presentation on a remote user device, e.g., using a specific remote display protocol. As another example, the job request may be a request to test new software, updates, or configurations on one or more data processing frameworks before execution on the main processing framework, e.g., using one or more sandboxed testing environments. As another example, a job request may be a request to create a backup of a special purpose virtual machine to allow an application to make changes to the existing software environment, and in response to a harmful change, restore the original operating system and hardware disk, e.g., by restoring the backup. The job resolution system 114 may process job requests for several different service types, e.g., job requests for a distributed data processing framework and job requests for a remote display protocol.

In order to process received job requests, the job resolution system 114 maintains a set of parent special purpose VMs 108a-108c. The job resolution system 114 uses the parent special purpose VMs 108*a*-108*c* as templates to create and provision child special purpose VMs to execute the job request.

Each of the parent special purpose VMs 108*a*-108*c* executes on one of multiple physical machines 102*a* and 102*b*. The physical machines 102*a* and 102*b* include physical hardware 104*a* and 104*b*, for example, a processor (CPU), a memory management unit (MMU), memory (e.g., Random Access Memory (RAM)), a local storage unit (e.g., hard disk or flash memory), a network adapter, and so on. The physical machines 102*a* and 102*b* also each include a hypervisor 106*a* or 106*b*, respectively. A hypervisor, e.g., hypervisor 106*a* or 106*b*, is a virtualization software layer that resides on a hardware platform, e.g., hardware platform 104*a* or 104*b*, of a physical machine, e.g., 102*a* or 102*b*. The job resolution system 114 uses the hypervisor layers 106*a* and 106*b* to manage a virtual machine execution space to execute VMs on the physical machines 102*a* and 102*b*. Each virtual hardware platform 104*a* or 104*b* also includes emulated hardware, e.g., a virtual storage device, a virtual network adapter/interface, virtual memory, a virtual processor, and so on.

Figure 1B:
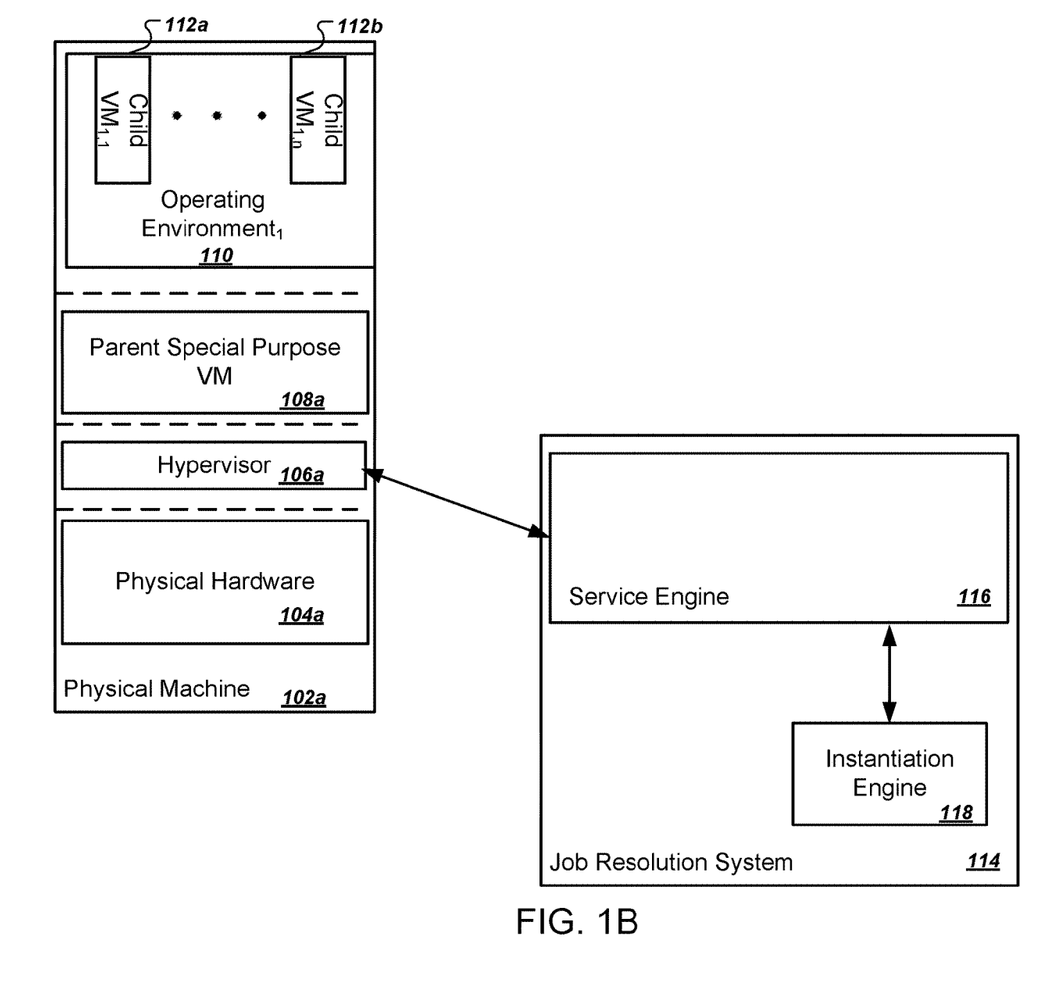
FIG. 1B shows the example job resolution system executing a job request using special purpose VMs.

Each of the parent special purpose VMs 108*a*-108*c* is specific to a respective service type of a job request and executes on one of multiple physical machines 102*a* and 102*b*. That is, the infrastructure and configuration of each parent special purpose VM 108*a*-108*c* supports an optimal operating environment, e.g., operating environment 110 of FIG. 1B, for a respective service type. An optimal operating environment, e.g. operating environment 110 of FIG. 1B, is a set of configurations, software applications, operating system, and other aspects of a software framework that support a respective purpose. For example, the job resolution system 114 may select a particular parent special purpose VM, e.g., one of the parent special purpose VMs 108*a*-108*c*, that has specific parameters or configurations. The selected parent special VM, e.g. parent special purpose VM 110 of FIG. 1B, performs the job request, e.g., the distributed computation, the testing of software, or the generation of user interface data, using the operating environment, e.g., operating environment 110 of FIG. 1B.

FIG. 1B shows the example job resolution system performing the job request using the special purpose VMs. The job resolution system 114 implemented as computer programs, appropriately programmed on the one or more computers, processes the job request using the components and techniques described below.

For a job request, the job resolution system 114 uses a parent special purpose VM, e.g., parent special purpose VM 108*a*, to instantiate one or more child special purpose VMs, e.g., child special purpose VMs 112*a* or 112*b*, in an optimal operating environment, e.g. operating environment 110, for a respective service type. Operating environments, e.g., operating environment 110, include a software framework, operating system, and both hardware and software configurations that the job resolution system 114 uses to perform tasks. The software framework may include support programs, a file system, compilers, code libraries, tool sets, application programming interfaces (APIs), and so on that bring together different components to enable development of a project or solution, for example, the completion of a job request. For example, Hadoop® and MongoDB® are example software frameworks.

The job resolution system 114 includes a service engine 116 that receives a job request submitted to the job resolution system 114 and selects an appropriate parent special purpose VM 108*a* executing on physical machine 102*a*.

The service engine 116 of the job resolution system 114 identifies one or more tasks in the job request that, when performed, collectively result in the completion of the job. A job is a series of tasks that perform an action that changes the status of a managed object. Some or all of the tasks that make up a job may depend on one or more of the other tasks that make up the job. A task depends on another task if data from the other task is necessary to complete execution of the task. In some implementations, the job resolution system 114 identifies one or more subtasks in one or more of the tasks, and the performance of the subtasks collectively results in the completion of the task.

The job resolution system 114 also includes an instantiation engine 118 that causes the selected parent special purpose VM 108*a* to instantiate one or more child special purpose VMs 112*a* or 112*b*. Each child special purpose VM 112*a* or 112*b* is a separate VM. In some implementations, the child special purpose VM is an independent copy of the parent special purpose VM. In other implementations, the child special purpose VM shares virtual disks with the parent special virtual machine. The instantiation engine 118 also causes the child special purpose VM to de-instantiate when a job is complete.

The instantiation engine 118 determines the number of children special purpose VMs to instantiate based on the number of tasks. For a job that is a single task, the instantiation engine 118 may cause the parent special purpose VM to instantiate a single child special purpose VM to execute the assigned task. For more complex jobs that include a collection of tasks, the instantiation agent 118 may cause the parent special purpose VM to instantiate multiple child special purpose VMs. The user or system may limit the instantiation of the number of children based on parameters, configurations, resource availability, or other limitations. The job resolution system 114 may also use these factors to determine an optimal number of children special purpose VMs to execute the job. In some implementations, the system may determine the number of additional child special purpose VMs to cause a child special purpose VM to instantiate based on these factors.

The service engine 116 assigns the identified tasks to the instantiated child special purpose VMs with each child special purpose assigned at least one task. The service engine 116 also determines if a task includes subtasks. In these instances, the instantiation engine 118 causes the respective child special purpose VM to instantiate additional child special purpose VMs, and then the service engine 116 assigns at least one subtask to each additional child special purpose VM. The process for assigning the subtasks for execution is described in more detail below with reference to FIG. 3.

The service engine 116 uses the child special purpose VMs 112*a* or 112*b* to execute the assigned tasks. For example, the service engine 116 can cause the child special purpose VMs 112*a* or 112*b* on physical machine 102*a* to execute the respective assigned tasks.

The service engine 116 receives an output from each child special purpose VM assigned to perform a task. The service engine 116 aggregates and integrates the output from each child special purpose VM, and then, the service engine 116 stores the job results in memory or provides the job results to an external system, e.g., to the user who requested the job. The process for executing a job request is described in more detail below with reference to FIG. 2.

In some implementations, the manner in which the job resolution system 114 processes a given received job request is abstracted away from the user submitting the request. In particular, by converting the job request to a job to be processed using the parent special purpose VMs and the child special purpose VMs and then aggregating the output before it is provided to the user, the job resolution system 114 processes a job request and provides the results to the user in a distributed manner using virtual machines without the user needing to format job requests for processing by any specified collection of virtual machines.

Figure 2:
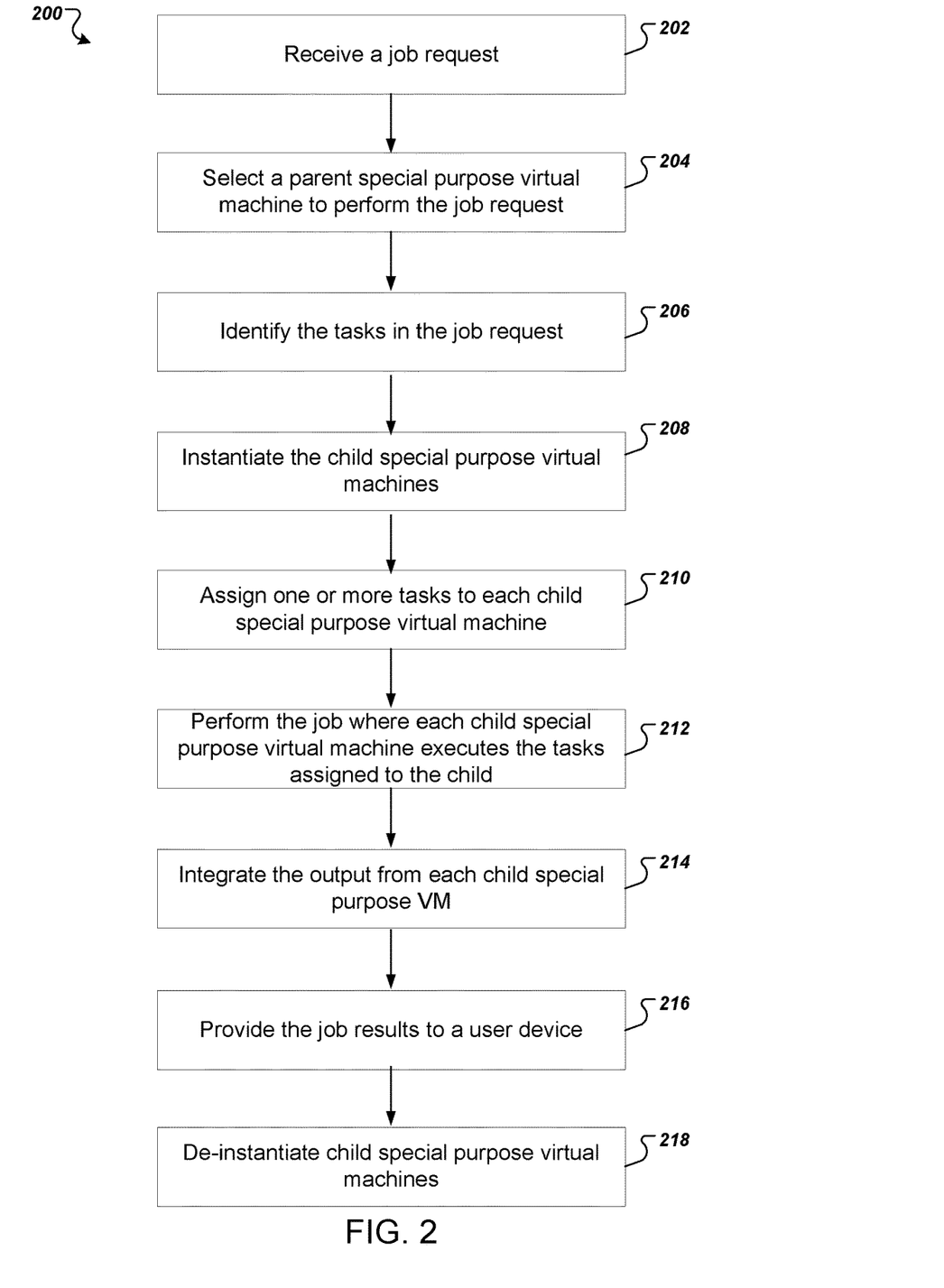
FIG. 2 is a flow diagram of an example process for executing a job request.

The service engine 116 and instantiation engine 118 use system commands to cause the hypervisor to perform specified actions, for example, to instantiate or de-instantiate one or more child special purpose VMs, associate a set of access privileges with the child special purpose VMs, and to monitor the resource availability of the child special purpose VMs. Example system commands that can be used by the service engine and the instantiation engine to communicate with a hypervisor are shown in Table 1.

system selects the parent special purpose VM based on the respective service type to provide the optimal environment to perform the job request. In some implementations, the parent special purpose VMs are already executing, e.g., in a paused state.

The system identifies the tasks in the job request (step 206) based on the operating environment in which the system performs the job request.

The system instantiates one or more child special purpose VMs using the selected parent special purpose VM (step 208). That is, the system causes the hypervisor that manages the parent special purpose VM to instantiate the child special purpose VMs from the parent special purpose VM. The system determines the number of child special purpose VMs to instantiate based on the number of tasks.

The system instantiates the one or more child special purpose VMs in an identical state as the parent special

TABLE 1

| API | Description | Implementation |
|---|---|---|
| fork( ) | Create one or more VMs | Hypercall to memory; power children |
| getVMId( ), getParentVMId | Get VM/Parent VM Identifier | Instance UUID of VM |
| exit( ) | Exit | Call power-off inside VM |
| wait( ) | Wait for child(ren) state change | API call to wait for power-off of VM |
| exec( ), execl( ) | Power on new VM instance | Power-on child VM |
| nice( ) | Change VM priority | Adjust child VM memory/CPU shares |
| send( ), recv( ), pipe( ) | Communicate between VMs | RDMA, shared memory, or TCP |
| mutexLock( ), mutexUnlock( ) | Synchronization between VMs | RDMA or share memory-based locking |
| kill( ) | Terminate target VM | API to power off the VM |
| suspend | Create one or more VMs | Hypercall to memory; power children |
| resume | Resume VM | API to power on the VM |
| exstop | Monitor VM statistics | |
| ps | Query list of running child(ren) | API to get list of worker VMs |
| root, regular user | Assign different privileges to VMs | Grant VM privilege to utilize above APIs |

FIG. 2 is a flow diagram of an example process 200 for executing a job request using a set of VMs. The process 200 is performed by a system of one or more computers. For example, a job resolution system, e.g., the job resolution system 114 of FIGS. 1A and 1B, appropriately programmed, can perform the process 200.

The system receives a job request (step 202). Generally, a job request is a request to process input data identified in the request using a specific service. For example, the job request may be a request to perform a specified distributed computation on a set of data received with the request using a specific distributed data processing framework. As another example, the job request may be a request to provide user interface data generated by one or more applications for presentation on a remote user device, e.g., using a specific remote display protocol. The job request may also be a request to test new software, updates, or configurations on one or more data processing frameworks before execution on the main processing framework, e.g., using one or more sandboxed testing environments. A job request may also be a request to create a backup of a special purpose virtual machine to allow an application to make changes to the existing software environment, and in response to a harmful change, restore the original operating system and hardware disk, e.g., by restoring the backup.

The system selects a parent special purpose VM from among a set of parent special purpose VMs to perform the job request (step 204). Each of the parent special purpose VMs is specific to a respective service type. That is, the configuration of the parent special purpose VM provides the optimal settings to perform the respective job request. The purpose VM by duplicating the state information of the parent special purpose VM. The state information of a VM includes configuration settings, power state, and software that make up the VM.

In some implementations, the system provides additional state information to the child special purpose VMs. The additional information may include status information to distinguish between the parent and child special purpose VMs. For example, the status information may indicate that there was a failure in the instantiation of the child or that the instantiation was successful. The additional information may also include a unique identifier for each child special purpose VM. The system determines a unique identity for each child special purpose VM based on the unique identifier. Upon an error, the system may use the unique identifier to identify the child special purpose VM that had a failure.

The system may instantiate the one or more child special purpose VMs as fully independent VMs that are separate from the parent special purpose VM. A fully independent child special purpose VM does not share virtual disks with the parent special purpose VM and operates separate from the parent special purpose VM. In other implementations, the one or more child special purpose VMs share virtual disks with the parent special purpose VM in an ongoing manner.

The system may also associate a set of access privileges with the child special purpose VM. For example, VMs, like processes, may run as root or regular users and may belong in different groups that have different privileges enabled or disabled to execute certain operations.

The system assigns one or more of the identified tasks to each child special purpose VM (step 210). In some implementations, the system groups related tasks to execute on a single child purpose VM to reduce communication overhead. For example, tasks that depend on one another during execution are more related than tasks that are independent of one another. Thus, the system may assign all the related tasks to the same child special purpose VM if it has sufficient resources to process all of the related tasks. The system determines the tasks to assign to each child special purpose VM based on the interaction among the tasks, the resource availability of the child special purpose VM, and the estimated resource cost of each of the tasks. The resource cost includes an estimate of the amount of processing power or memory use a task requires. If the combined resource cost of a set of tasks exceeds the resource availability on a child special purpose VM, the system assigns one or more of the tasks in the set of tasks to another child special purpose VM.

The system may also determine that one or more of the assigned tasks are composed of multiple subtasks. In response, the system instantiates additional child special purpose VMs. The system then assigns the subtasks to the additional child special purpose VMs and executes the subtasks on the additional child special purpose VMs. The process for assigning the subtasks for execution is described in more detail below with reference to FIG. 3.

The system causes each child special purpose VM to execute the assigned tasks by having each of the child special purpose VMs launch the necessary daemons or tools to process the tasks assigned to the child special purpose VM (step 212). For each completed assigned task, the system receives an output from the child special purpose VM assigned to perform the task.

After the system receives an output from each child special purpose VM assigned to perform a task, the system aggregates and integrates the each output (step 214). That is, the system generates a collective output based on the output from each child special purpose VM by aggregating and integrating the received output. The system then provides the job results to a user device (step 216). For example, the job request may include testing a new software upgrade or configuration across multiple software platforms with each child special purpose VM representing a respective software platform, and then the system generating an integrated rendering of the aggregated test results to send to the user device that submitted the job request to the system. In some implementations, the system stores the job results in memory.

In response to determining that the tasks are complete, the system de-instantiates the child special purpose virtual machines (step 218). The system de-instantiates the child special purpose VMs to reduce the use of the resources. In some implementations, the system de-instantiates the child special purpose VMs as each one completes their assigned tasks. In other implementations, the system waits for all child special purpose VMs to complete their tasks before de-instantiating the child special purpose VMs.

Figure 3:
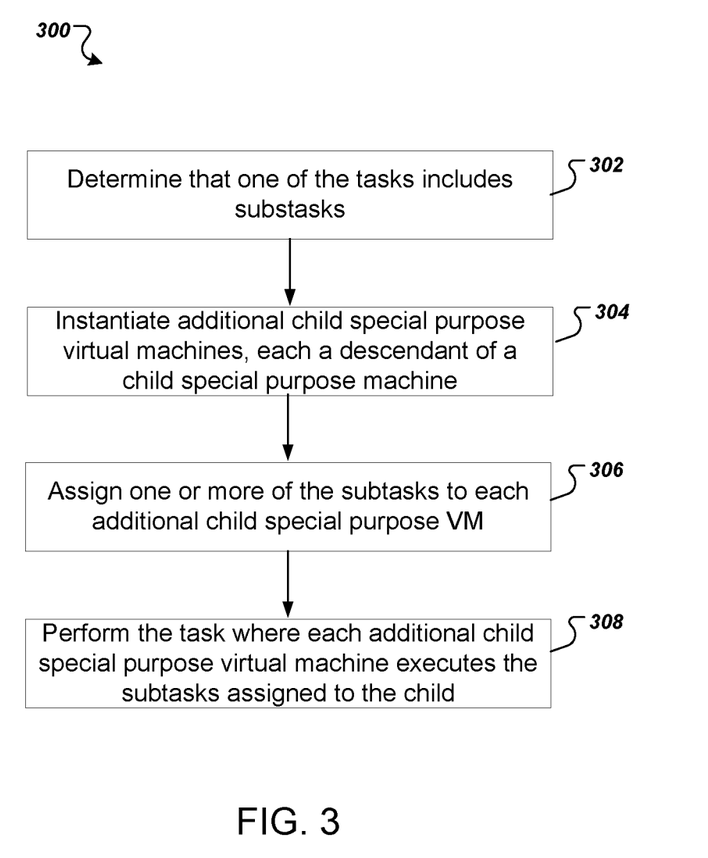
FIG. 3 is a flow diagram of an example process for assigning the subtasks for execution.

FIG. 3 is a flow diagram of an example process 300 for assigning the subtasks for execution. The process 300 is performed by a system of one or more computers. For example, a job resolution system 114 of FIG. 1A, appropriately programmed, can perform the process 300.

The system determines that a task assigned to one of the child special purpose VMs includes subtasks (step 302). A task is a smaller unit of executable work than a job that the system performs to complete the job. In some implementations, one or more tasks include one or more subtasks. The system determines that a task includes multiple subtasks by identifying that the task is divisible into a set of smaller executable units that the system may execute in parallel or in a distributed manner.

In response to determining that an assigned task includes subtasks, the system causes the respective child special purpose VM assigned the task to instantiate one or more additional child special purpose VMs (step 304). The system determines the number of additional child special purpose VMs to instantiate based on the complexity of the task. The system may also instantiate the additional child special purpose VM in the same identical state as the child special purpose VM. In some implementations, the system also includes additional information in the initial state of the additional child special purpose VM.

The system assigns one or more of the subtasks to each of the additional child special purpose VMs (step 306). The system assigns the subtasks to the additional child special purpose VMs as described above with reference to FIG. 2.

The system performs the task by causing each of the additional child special purpose VMs to execute subtasks assigned to the additional child special purpose VM (step 308). The completion of a subtask may require that an additional child special purpose VM communicate with another VM.

The system may perform tasks and subtasks that depend on each other on different child special purpose VMs. That is, a task on a first child special purpose VM may provide data to one or more tasks or subtasks on one or more second child special purpose VMs, and the tasks or subtasks on the one or more second child special purpose VMs that require the received data may depend on the data sent from the task on the first child special purpose VM to perform the assigned task or subtask. In these cases, two child VMs may need to read and write from the same memory location while performing their assigned tasks.

Figure 4:
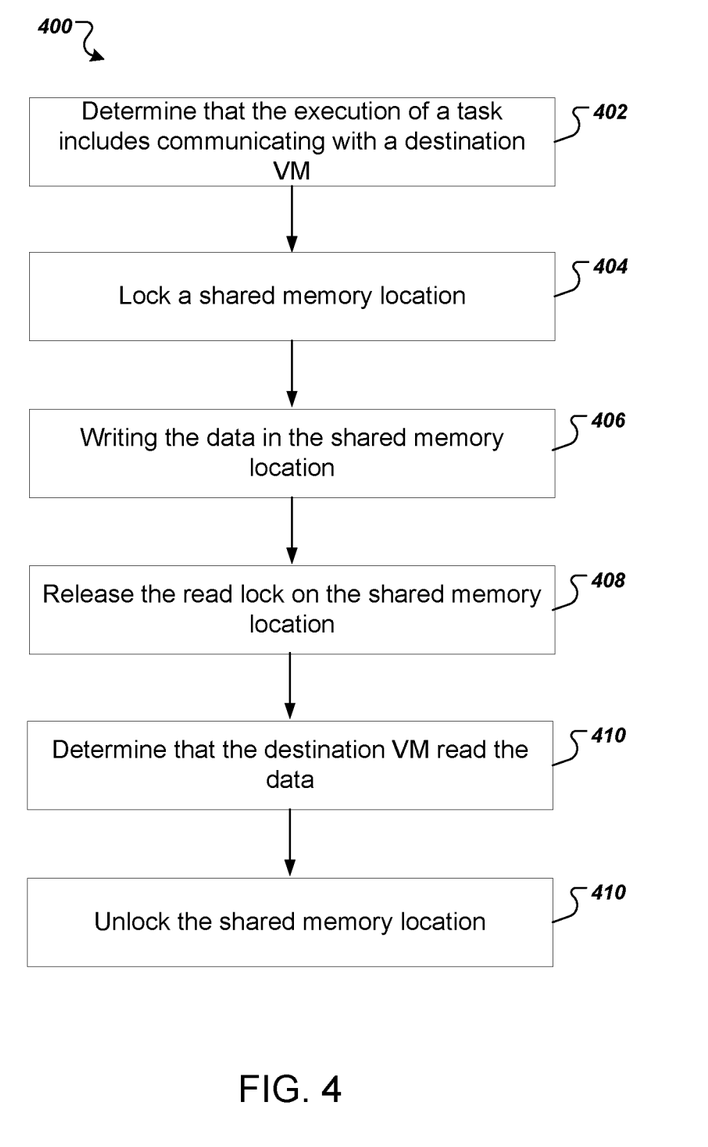
FIG. 4 is a flow diagram of an example process for inter-VM communication.

FIG. 4 is a flow diagram of an example process 400 for inter-VM communication. The process 400 is performed by a system of one or more computers. For example, one of the child special purpose VMs 112a or 112b of FIG. 1B, appropriately programmed, can perform the process 400.

A first child special purpose VM ("source VM") determines that the execution of a task includes communicating with one or more second child special purpose VM ("destination VMs") (step 402). The source VM may reside on a different physical machine than the one or more destination VMs and communicate to the one or more destination VMs across a data communication network.

The source VM accesses and locks a shared memory location (step 404). The source VM accesses the shared memory location by writing to or reading data from a virtual memory address that maps to a corresponding physical memory address. The source VM also places a write and read lock on the shared memory location that prevents other VMs from accessing, including writing to or reading from, the corresponding physical memory address.

The source VM writes the data or message into the shared memory location (step 406). The written data may include a recipient identifier. The recipient identifier may identify one or more destination VMs.

After the source VM has written the data or message into the shared memory location, the source VM releases the read lock on the shared memory location allowing other VMs to read from the shared memory location (step 408).

The source VM determines when the destination VM has read the data (step 410). In some implementations, the source VM may receive a notification from the destination VM indicating that the destination VM has read the shared memory location. In other implementations, the destination VM sends a message receipt to the source VM.

In response to determining that the destination VM read the data, the source VM unlocks the shared memory location (step 412). That is, the source VM releases the write lock on the shared memory location, and another source VM may now write to the shared memory to communicate to one or more destination VMs.

The hypervisor supports inter-VM communication primitives to enable efficient communication and synchronization between VMs to send and receive messages. In some implementations, inter-VM communication and synchronization use the standard TCP/IP stack or a piping implementation. Example commands that allow the child special purpose VMs to perform inter-VM communication and synchronization are described in Table 1 above.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for processing job requests using special purpose virtual machines, the method comprising:

receiving a job request, wherein the job request specifies a first job to be performed by a plurality of a special purpose virtual machines, wherein the first job is separable into a plurality of tasks for processing data that when performed collectively complete the job, and wherein the job request specifies a specific service to be used in performing the job;

selecting a parent special purpose virtual machine from a plurality of parent special purpose virtual machines to perform the first job based on a type of service used to perform the first job, wherein each parent special purpose virtual machine is specifically configured to support a respective service type, and wherein each parent special purpose virtual machine is used as a template to create and provision respective child special purpose virtual machines configured to support the corresponding service type to execute the job request;

determining a plurality of child special purpose virtual machines to instantiate based on a number of tasks in the plurality of tasks of the first job;

instantiating the plurality of child special purpose virtual machines from the selected parent special purpose virtual machine;

partitioning the plurality of tasks among the plurality of child special purpose virtual machines by assigning one or more of the plurality of tasks to each of the child special purpose virtual machines; and performing the first job by causing each of the child special purpose virtual machines of the parent special purpose virtual machine to execute the respective tasks assigned to the child special purpose virtual machine, wherein the execution of a first task performed on a first child special purpose virtual machine includes communicating data to one or more second child special purpose virtual machines executing respective tasks of the first job in parallel with the first task, wherein the tasks of the one or more second child special purpose virtual machines depend on data received from the first task being performed on the first child special purpose virtual machine.

2. The method of claim 1, wherein instantiating the plurality of child special purpose virtual machines from the selected parent special purpose virtual machine includes spawning each child special purpose virtual machine with an identical state as the selected parent special purpose virtual machine.

3. The method of claim 1, wherein each of the parent special purpose virtual machines 1s specific to a respective type of job, and selecting the parent special purpose virtual machine comprises:

determining a type of job of the first job; and selecting a parent special purpose virtual machine that is specific to the type of the first job.

4. The method of claim 1, wherein each child special purpose virtual machine includes a set of access privileges to execute one or more operations.

5. The method of claim 1, wherein the selected parent special purpose virtual machine defines an operating environment for the child special purpose virtual machines.

6. The method of claim 5, wherein the operating environment synchronizes communication among the child special purpose virtual machines.

7. The method of claim 1, further comprising:
determining that a task assigned to a third child special purpose virtual machine includes a plurality of subtasks;
instantiating one or more additional child special purpose virtual machines, each a descendant of the first child special purpose virtual machine;
partitioning the plurality of subtasks of the task among the additional child special purpose virtual machines by assigning one or more subtasks to each of the child special purpose virtual machines;
determining that the first job is complete; and
in response to determining that the first job is complete, de-instantiating the child special purpose virtual machines.

8. The method of claim 1, wherein assigning one or more of the plurality of tasks to each of the child special purpose virtual machines includes determining an interaction among the tasks and grouping related tasks to execute on a single child special purpose virtual machine.

9. The method of claim 1, further comprising aggregating an output from each child special purpose virtual machine and generating a collective output for the first job.

10. The method of claim 1, wherein the first task assigned to the first child special purpose virtual machine provides data to one or more tasks assigned to one or more other child special purpose virtual machines that require the data to perform respective assigned tasks comprising:
writing, by the first child special purpose virtual machine, data into a shared memory location,
placing a write lock on the shared memory location,
determining that the one or more other child special purpose virtual machines have read the data, and
in response, releasing the write lock on the shared memory location.

11. A system for processing job requests using special purpose virtual machines, comprising:
one or more processors configured to interact with a computer storage medium in order to perform operations comprising:
receiving a job request, wherein the job request specifies a first job to be performed by a plurality of a special purpose virtual machines, wherein the first job is separable into a plurality of tasks for processing data that when performed collectively complete the job, and wherein the job request specifies a specific service to be used in performing the job;
selecting a parent special purpose virtual machine from a plurality of parent special purpose virtual machines to perform the first job based on a type service used to perform of the first job, wherein each parent special purpose virtual machine is specifically configured to support a respective service type, and wherein each parent special purpose virtual machine is used as a template to create and provision respective child special purpose virtual machines configured to support the corresponding service type to execute the job request;
determining a plurality of child special purpose virtual machines to instantiate based on a number of tasks in the plurality of tasks of the first job;
instantiating the plurality of child special purpose virtual machines from the selected parent special purpose virtual machine;
partitioning the plurality of tasks among the plurality of child special purpose virtual machines by assigning one or more of the plurality of tasks to each of the child special purpose virtual machines; and
performing the first job by causing each of the child special purpose virtual machines of the parent special purpose virtual machine to execute the respective tasks assigned to the child special purpose virtual machine, wherein the execution of a first task performed on a first child special purpose virtual machine includes communicating data to one or more second child special purpose virtual machines executing respective tasks of the first job in parallel with the first task, wherein the tasks of the one or more second child special purpose virtual machines depend on data received from the first task being performed on the first child special purpose virtual machine.

12. The system of claim 11, wherein instantiating the plurality of child special purpose virtual machines from the selected parent special purpose virtual machine includes spawning each child special purpose virtual machine with an identical state as the selected parent special purpose virtual machine.

13. The system of claim 11, wherein each of the parent special purpose virtual machines 1s specific to a respective type of job, and selecting the parent special purpose virtual machine comprises:
determining a type of job of the first job; and
selecting a parent special purpose virtual machine that is specific to the type of the first job.

14. The system of claim 11, wherein each child special purpose virtual machine includes a set of access privileges to execute one or more operations.

15. The system of claim 11, wherein the selected parent special purpose virtual machine defines an operating environment for the child special purpose virtual machines.

16. The system of claim 15, wherein the operating environment synchronizes communication among the child special purpose virtual machines.

17. The system of claim 11, further configured to perform operations comprising:
determining that a task assigned to a third child special purpose virtual machine includes a plurality of subtasks;
instantiating one or more additional child special purpose virtual machines, each a descendant of the first child special purpose virtual machine;
partitioning the plurality of subtasks of the task among the additional child special purpose virtual machines by assigning one or more subtasks to each of the child special purpose virtual machines;
determining that the first job is complete; and
in response to determining that the first job is complete, de-instantiating the child special purpose virtual machines.

18. A non-transitory computer storage medium encoded with a computer program, the program comprising instructions that when executed by one or more computers cause the one or more computers to perform operations comprising:
receiving a job request, wherein the job request specifies a first job to be performed by a plurality of a special purpose virtual machines, wherein the first job is separable into a plurality of tasks for processing data that when performed collectively complete the job, and wherein the job request specifies a specific service to be used in performing the job;
selecting a parent special purpose virtual machine from a plurality of parent special purpose virtual machines to perform the first job based on a type service used to perform of the first job, wherein each parent special purpose virtual machine is specifically configured to support a respective service type, and wherein each parent special purpose virtual machine is used as a template to create and provision respective child special purpose virtual machines configured to support the corresponding service type to execute the job request;

determining a plurality of child special purpose virtual machines to instantiate based on a number of tasks of the plurality of tasks in the first job;

instantiating the plurality of child special purpose virtual machines from the selected parent special purpose virtual machine;

partitioning the plurality of tasks among the plurality of child special purpose virtual machines by assigning one or more of the plurality of tasks to each of the child special purpose virtual machines; and performing the first job by causing each of the child special purpose virtual machines of the parent special purpose virtual machine to execute the respective tasks assigned to the child special purpose virtual machine, wherein the execution of a first task performed on a first child special purpose virtual machine includes communicating data to one or more second child special purpose virtual machines executing respective tasks of the first job in parallel with the first task, wherein the tasks of the one or more second child special purpose virtual machines depend on data received from the first task being performed on the first child special purpose virtual machine.

19. The non-transitory computer storage medium of claim 18, wherein instantiating the plurality of child special purpose virtual machines from the selected parent special purpose virtual machine includes spawning each child special purpose virtual machine with an identical state as the selected parent special purpose virtual machine.

20. The non-transitory computer storage medium of claim 18, wherein each of the parent special purpose virtual machines is specific to a respective type of job, and selecting the parent special purpose virtual machine comprises:
   determining a type of job of the first job; and
   selecting a parent special purpose virtual machine that is specific to the type of the first job.

21. The non-transitory computer storage medium of claim 18, wherein each child special purpose virtual machine includes a set of access privileges to execute one or more operations.

22. The non-transitory computer storage medium of claim 18, wherein the selected parent special purpose virtual machine defines an operating environment for the child special purpose virtual machines.

23. The non-transitory computer storage medium of claim 18, the operations further comprise:
   determining that a task assigned to a third child special purpose virtual machine includes a plurality of subtasks;
   instantiating one or more additional child special purpose virtual machines, each a descendant of the first child special purpose virtual machine;
   partitioning the plurality of subtasks of the task among the additional child special purpose virtual machines by assigning one or more subtasks to each of the child special purpose virtual machines;
   determining that the first job is complete; and
   in response to determining that the first job is complete, de-instantiating the child special purpose virtual machines.

* * * * *